United States Patent
Hudson

(10) Patent No.: US 10,810,546 B2
(45) Date of Patent: Oct. 20, 2020

(54) SETTLING OBLIGATIONS VIA NETTING TRANSACTIONS

(71) Applicant: R3 Ltd., London (GB)

(72) Inventor: David Hudson, London (GB)

(73) Assignee: R3 LTD., London (GB)

( * ) Notice: Subject to any disclaimer, the term of this patent is extended or adjusted under 35 U.S.C. 154(b) by 321 days.

(21) Appl. No.: 15/722,984

(22) Filed: Oct. 2, 2017

(65) Prior Publication Data
US 2019/0102736 A1    Apr. 4, 2019

Related U.S. Application Data

(60) Provisional application No. 62/566,664, filed on Oct. 2, 2017.

(51) Int. Cl.
*G06Q 10/00* (2012.01)
*G06Q 10/08* (2012.01)
*G06Q 40/00* (2012.01)

(52) U.S. Cl.
CPC ......... *G06Q 10/0875* (2013.01); *G06Q 40/00* (2013.01); *G06Q 2220/00* (2013.01)

(58) Field of Classification Search
CPC ...... G06Q 20/02; G06Q 20/06; G06Q 20/223; G06Q 20/3825; G06Q 20/3827; G06Q 20/401; G06Q 40/02; G06Q 40/04; G06Q 10/0875; G06Q 40/00; G06Q 20/102; G06Q 2220/12; G06Q 20/20
See application file for complete search history.

(56) References Cited

U.S. PATENT DOCUMENTS

| | | | |
|---|---|---|---|
| 9,794,074 B2* | 10/2017 | Toll | H04L 9/0618 |
| 10,630,769 B2* | 4/2020 | Carver | H04L 67/108 |
| 2017/0243193 A1* | 8/2017 | Manian | G06Q 20/065 |
| 2017/0352012 A1* | 12/2017 | Hearn | G06Q 20/065 |
| 2019/0028276 A1* | 1/2019 | Pierce | H04L 9/3234 |
| 2019/0043050 A1* | 2/2019 | Smith | H04L 9/0637 |
| 2019/0108513 A1* | 4/2019 | Kano | H04L 9/32 |

(Continued)

FOREIGN PATENT DOCUMENTS

WO    WO-2019042101 A1 *    3/2019

OTHER PUBLICATIONS

Nakamoto, Satoshi, "Bitcoin: A Peer-to-Peer Electronic Cash System," http://www.bitcoin.org/bitcoin.pdf, pp. 1-9, Jul. 4, 2010.

(Continued)

*Primary Examiner* — Florian M Zeender
*Assistant Examiner* — Milena Racic
(74) *Attorney, Agent, or Firm* — Perkins Coie LLP

(57) ABSTRACT

A system is provided for netting obligations between entities of a cycle of obligations. Each obligation specifying an quantity of an item that a from-entity of the cycle is obligated to provide to a to-entity of the cycle. For each entity, the system determines whether the sum of its inventory of the item and the quantity of the obligation on which it is a to-entity is sufficient to satisfy the obligation on which it is a from-entity. When sufficient, the system identifies one or more netting transactions to settle the obligations of the cycle. The system then directs the execution of the netting transactions and settlement transactions to effect and record the settling of the obligations.

19 Claims, 14 Drawing Sheets

(56) References Cited

U.S. PATENT DOCUMENTS

2019/0122186 A1\* 4/2019 Kano .................... G06Q 20/065
2019/0188711 A1\* 6/2019 Wu ...................... G06Q 20/381
2019/0199514 A1\* 6/2019 Hari ..................... H04L 9/3297
2019/0251199 A1\* 8/2019 Klianev .............. G06F 11/1438

OTHER PUBLICATIONS

International Search Report and Written Opinion issued for PCT/GB2018/052757 dated Nov. 26, 2018.

\* cited by examiner

SETTLING OBLIGATIONS VIA NETTING TRANSACTIONS

CROSS-REFERENCE TO RELATED APPLICATION

This application claims the benefit of U.S. Provisional Application No. 62/566,664, filed on Oct. 2, 2017, which is hereby incorporated by reference in its entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

In many industries, one entity is contractually obligated to provide a certain quantity of an item to another entity. For example, in a commodity industry (e.g., the petroleum industry), many entities may each own a quantity of crude oil of a petroleum reserve. Two entities may enter an agreement in which a from-entity is to transfer ownership of a certain quantity of crude oil to the to-entity. If the from-entity does not currently own enough crude oil (i.e., its inventory) to make the transfer, then the entities may agree to an obligation in which the from-entity is obligated to transfer the certain quantity of crude oil to the to-entity. As another example, in the banking industry, each bank has a certain amount of money and may have entered into various obligations with other banks to pay a certain amount of money.

DETAILED DESCRIPTION

A method and system for netting obligations for providing quantities of items between entities is described. The netting of obligations allows for obligations to be settled even though the from-entities of the obligations do not currently have enough inventory of the item to settle their obligations. To settle such obligations, a Transaction Netting ("TxN") system generates netting transactions for a group of entities that have obligations to one another to transfer quantities of the items between the entities in such a way that the net effect is that all the obligations are settled (or at least partially settled). The TxN system first identifies cycles of obligations between entities. A cycle of obligations is a collection of a number of entities and a number of obligations where each entity is a to-entity of one or more obligations to the same from-entity and a from-entity of one or more obligations from the same from-entity of the cycle. Each obligation obligates the from-entity to provide a certain quantity of an item to the to-entity. For example, in a cycle of three entities, A, B, and C, the first obligation has A as the from-entity, a certain quantity, and B as the to-entity, the second obligation has B as the from-entity, a certain quantity, and C as the to-entity, and the third obligation has C as the from-entity, a certain quantity, and A as the to-entity. From the field of graph theory, the entities may be considered to represent vertices or nodes and the obligations may be considered to represent directed edges or links.

Figure 1:
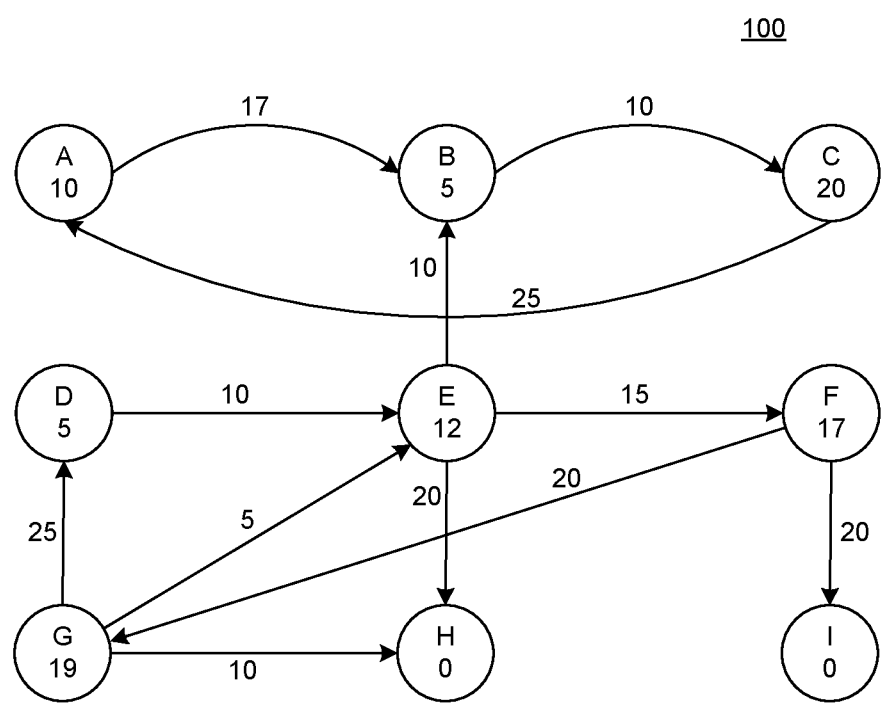
FIG. 1 illustrates a network of entities and their obligations.

FIG. 1 illustrates a network of entities and their obligations. Network 100 is formed by entities and the obligations between the entities. The circles A-I represent entities (i.e., vertices or nodes of the graph), and the directed lines represent obligations (i.e., edges of the graph). For example, A and B are parties to an obligation in which A is the from-entity, the quantity is 17, and B is the to-entity, and B and C are parties to an obligation in which B is the from-entity, the quantity is 10, and C is the to-entity. These obligations can be represented as (A, 17, B) and (B, 10, C). The network includes three cycles: (A, B, C), (E, F, G), and (D, E, F, G). If a from-entity has multiple obligations to the same to-entity, then the directed line represents the sum of the quantities of those obligations.

Figure 2:
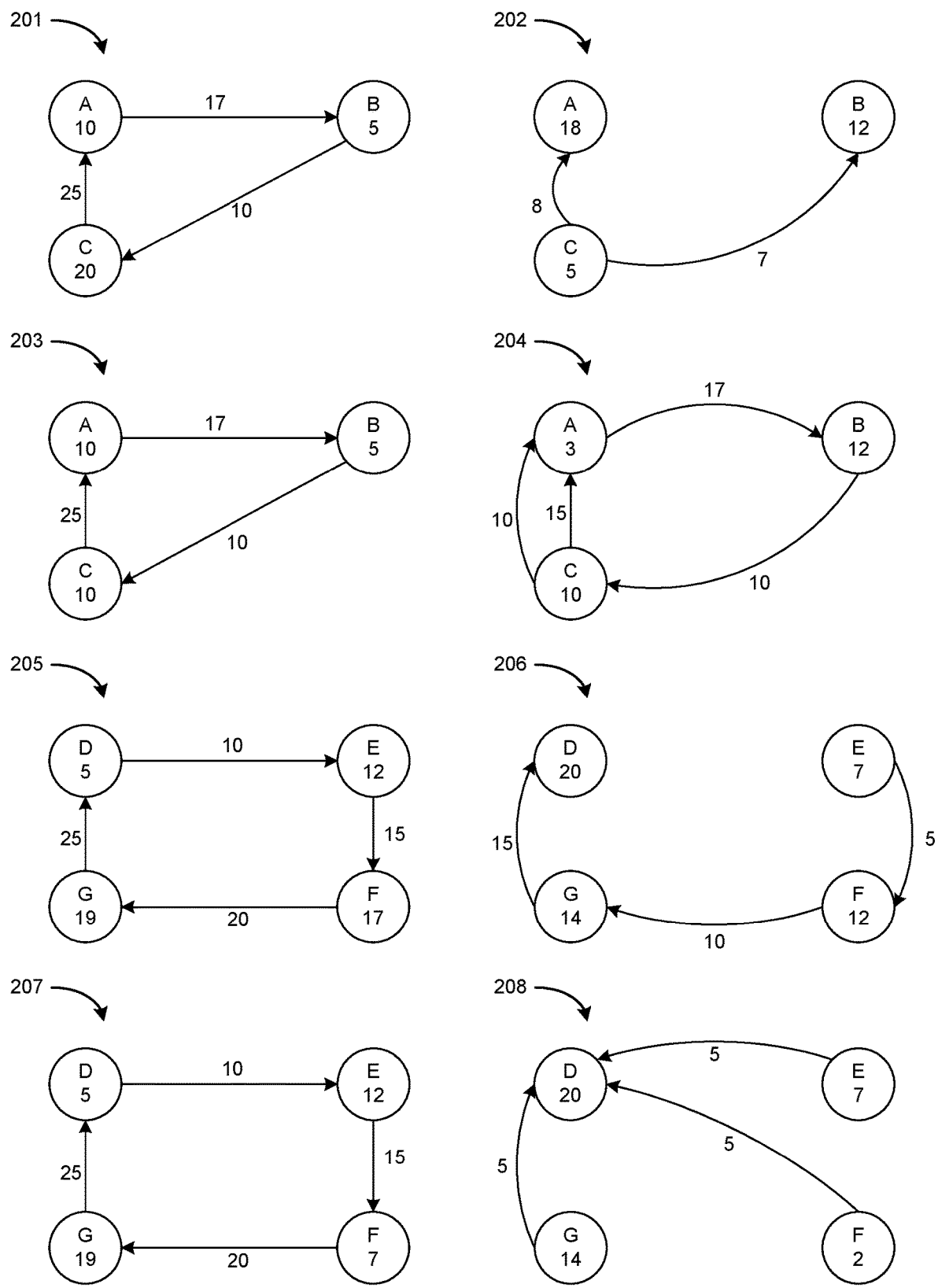
FIG. 2 illustrates the netting transactions for various cycles.

FIG. 2 illustrates the netting transactions for various cycles. Cycle 201 represents a cycle of three entities with obligations (A, 17, B), (B, 10, C), and (C, 25, A). The numbers within the circles represent the current inventory of the items that each has on hand. A has an inventory of 10, B has an inventory of 5, and C has an inventory of 20. In cycle 201, a gridlock exists because no entity has enough inventory to satisfy its obligation: A has an inventory of 10, which is less than the quantity of obligation (A, 17, B), B has an inventory of 5, which is less than the quantity of obligation (B, 10, C), and C has an inventory of 20, which is less than the quantity of obligation (C, 25, A). If each entity, however, were to be provided the quantity of the obligation in which it is the to-entity, that entity could satisfy the obligation in which it is the from-entity. For example, if A were provided with a quantity of 25 from C based on obligation (C, 25, A), then its inventory would increase to 35, A could provide a quantity of 17 to B to satisfy its obligation (A, 17, B), and B could provide a quantity of 10 to C to satisfy its obligation (B, 10, C). If the obligations could be settled, the inventory of A would be 18, B would be 12, and C would be 5, but since none of the entities has enough inventory to satisfy its obligations, the cycle is gridlocked.

In some embodiments, the TxN system generates netting transactions between entities of a cycle to settle the obligations of the cycle when no entity has sufficient inventory to satisfy its obligation. To determine whether the obligations of a cycle can be settled using netting transactions, the TxN system calculates an obligation net for each entity that is the difference between its input quantity (i.e., the quantity of an obligation in which the entity is the to-entity) and its output quantity (i.e., the quantity of an obligation in which the entity is the from-entity). The obligation net of A is 8 (i.e., 25-17), B is 7 (i.e., 17-10), and C is −15 (i.e., 10-25). If the sum of the inventory and the obligation net of each entity is greater than or equal to zero, then the TxN system can generate netting transactions to settle the obligations of the cycle. The TxN system generates one or more netting transactions for each entity whose obligation net is greater than zero that provides the obligation net quantity to that entity. The TxN system would generate two netting transactions for cycle 201. In one netting transaction, C provides a quantity of 8 to A, represented as netting transaction (C, 8, A), and in the other netting transaction, C provides a quantity of 7 to B, represented as netting transaction (C, 7, B). Since the netting transactions provide A and B with their obligation nets, from C, which had a negative obligation net, then after these netting transactions are executed, each entity will have an ending inventory that is the same as if each obligation was settled. Thus, when the netting transactions are executed, the TxN system designates the obligations of the cycle as settled. Graph 202 illustrates the netting transactions for cycle 201 indicated by the directed lines and the numbers within the circles indicating the ending inventory of the entities. The TxN system executes the transaction, including netting transactions and settlement transactions, as an atomic operation, that is, all succeed or none succeeds. If only some succeeded, then the inventories and obligations of the entities of the cycle would be incorrect. For example, if obligation (B, 10, C) was not settled, then B would have an inventory of 12 and an obligation of 10, rather than an inventory of 12 and no obligation.

Cycle 203 illustrates a cycle that is gridlocked, but whose obligations cannot be settled by netting transactions. Cycle 203 is the same as cycle 201 except that C has an inventory of 10, rather than 20. As a result, C has an obligation net of −15, which is greater than its inventory of 10. As such, C does not have enough inventory and input-quantity to settle its obligation with A. In such a case, the TxN system may not generate netting transactions for the cycle. In some embodiments, the TxN system may, however, perform a partial settlement of the obligations of the cycle. Graph 204 illustrates such a partial settlement. The curved lines represent netting transactions, and the straight line represents an obligation. The TxN system generates the netting transactions (C, 10, A), (A, 17, B), and (B, 10, C), full settlement transactions for obligations (A, 17, B) and (B, 10, C), and a partial settlement for obligation (C, 25, A) of a quantity of 10. In such a case, the netting transactions are to be executed in order so that each entity has sufficient inventory to settle or partially settle its obligation. Also, although not illustrated, the TxN system may generate an additional netting transaction (C, 10, A) and partial settlement for obligation (C, 15, A) of a quantity of 10 to be executed later, leaving only obligation (C, 5, A) unsettled.

Cycle 205 illustrates a cycle of four entities whose obligations can be fully settled. Since the sum of inventory and the obligation net of each entity is greater than or equal to zero, the TxN system can fully settle the obligations. Graph 206 illustrates that netting transactions (E, 5, F), (F, 10, G), and (G, 15, D) result in full settlement of the obligations.

Cycle 207 illustrates the same cycle as cycle 205 except that F has an inventory of 7, rather than 17. As a result, F does not have enough inventory to support the transaction (F, 10, G) needed for the full settlement illustrated by graph 206. The TxN system, however, can still fully settle the obligations. Graph 208 illustrates the netting transactions of (E, 5, D), (G, 5, D) and (F, 5, D) that can be used to fully settle the obligations.

In some embodiments, to settle obligations of a network of entities connected by their obligations, the TxN system identifies a cycle of obligations between entities whose obligations are candidates to be settled. The TxN system may access a centralized database of obligations to identify the cycles. If, however, the obligations are stored or recorded only at network nodes (i.e., computing systems) of the entities, the TxN system may send a message to be propagated through the network nodes requesting that the entities report their obligations so the obligations can be settled if possible. Such propagation of a message requesting the report of obligations is referred to as a "network scan," and the message is referred to as a "scan request." After collecting the obligations, the TxN system identifies cycles of obligations. The TxN system then selects a cycle and determines whether netting transactions can settle the obligations of that cycle. When the netting transactions can settle the obligations between the entities of the cycle, the TxN system identifies one or more netting transactions for settling the obligations of the cycle and then directs the execution of the netting transactions along with settlement transactions. In some embodiments, an initiator network node may only attempt to settle obligations of cycles that include the initiator network node. In such a case, the initiator network node may identify only those cycles that include the initiator network node.

Multiple network nodes may each be authorized to initiate a network scan. Thus, scan requests initiated by different network nodes may be in transit through the network. To help prevent simultaneous scan requests initiated by different network nodes resulting in duplication of effort, a network node that initiates a scan request may assign a "scan identifier" that is included in the scan request that it generates. If a network node receives a scan request while it is processing a previously received scan request, the network node decides which scan request it should complete. The network node may select the network scan having a scan identifier with the lower numeric value. If the network node is currently working on the scan request having a scan identifier with the higher numeric value, then the network node aborts all processing related to that scan request. If the network node is currently working on the scan request having a scan identifier with the lower numeric value, the network node responds to the newly received scan request indicating that the scan request collided with another scan request that is already in progress. A randomly generated number or a hash of the identifier of the initiator network node combined with a time stamp may be generated as a "scan identifier" for each network scan to help prevent one network node from always selecting a scan identifier with a low numeric value resulting in its initiated network scans always winning a collision. If a network node was able to always select scan identifiers that are likely to win collisions, that network node might be in a better position to use obligation information to a competitive advantage by, for example, guessing the real identities of the entities (which are preferably obscured in the reported obligations), determining average quantities of obligations, determining current inventories, generating netting transactions favorable to it, and so on. To further ensure that an initiator network node may not try to select scan identifier with low numeric values, the TxN system may require that an initiator network node actually nominate another network node to conduct the scan and generate the netting transactions. In such a case, the initiator network node sends to the nominated network node a signed request with a scan identifier generated using its identifier and a timestamp. The nominated network node counter-signs the request and initiates the scan. A receiving network node that receives a scan request can verify that the initiator network node and the nominated network node are different. If not, the receiving network node can refuse to participate in the network scan. Because the initiator network node that generates the scan identifier neither receives the results of the scan nor generates the netting transactions, the initiator network node has no incentive to select a scan identifier with a low numeric value because it could be detrimental to the initiator network node.

In some embodiments, the TxN system may employ a notary to finalize execution of the transactions for a cycle. To notarize the transactions, the TxN system may generate a compound transaction for a cycle that includes the netting transactions and the settlement transactions. The TxN system then requests each entity of the cycle to authorize the compound transaction to proceed by signing the compound transaction. The TxN system then submits the signed compound transaction to the notary. The notary ensures that that each entity has an inventory that is greater than or equal to the quantity of the netting transactions for which it is a from-entity. An entity may have depleted its inventory from the time the entity reported its obligations and inventory and the TxN system sent the compound transaction to the notary. In such a case, the notary would report that the compound transaction could not be executed and would not execute any transaction of the compound transaction.

In some embodiments, when a network node decides that obligations of the network should be settled by netting transactions, that network node operates as an initiator network node or just initiator of the netting process by having the TxN system send a network scan request to the network nodes of the network. After receiving the responses, the initiator network node identifies the netting transactions for the cycles and generates a compound transaction for each cycle whose obligations can be settled. The TxN system of the initiator network node may then send each compound transaction for a cycle to a network node of an entity of the cycle when the initiator network node is not part of that cycle. To locate such a network node, the initiator network node may conduct a search of the network nodes to locate the shortest path to such a network node. An algorithm for finding such a shortest path is that A* search algorithm described Hart, P. E.; Nilsson, N. J.; Raphael, B., "A Formal Basis for the Heuristic Determination of Minimum Cost Paths," IEEE Transactions on Systems Science and Cybernetics SSC4, 1968, 4 (2), pp. 100-107, which is hereby incorporated by reference. The network node that receives a compound transaction then signs the compound transaction and requests the other entity of the cycle to authorize the compound transaction to proceed by signing the compound transaction. The network node that received the compound transaction can then submit the compound transaction to the notary.

The TxN system operates in a network that is permissioned, that is only network nodes who are granted permission can participate in the network. To receive permission, a network node generates a self-signed certificate with their identity information of the entity associated with the network node. A self-signed certificate includes identity information of the entity and is signed using the private key of network node. The network node then requests the certificate authority of the network to sign the certificate (with the private key of the certificate authority). The network node can then use the certificate signed by the certificate authority to access the network. When connecting to the network for the first time, a network node registers their certificate, public key, and identity information with a mapping service of the network. Mapping service then sends the identity information to the other network nodes, which is cached by the network nodes. Since communications in the network may be on a node-to-node basis, a sender network node needs to know the identity to the recipient network node to send a message to the recipient network node.

Transactions and obligations need to identify the from-entity and the to-entity. Thus, a transactions and obligations could include the identify information of the entity. The including of such identity information in a transaction or obligation, however, presents problems as to confidentiality. For example, in the case of a transaction, the to-entity may need to trace the chain of transactions associated with the asset (e.g., item) of the transaction to ensure that the from-entity has clear chain of title to the asset. If the identity information was included, then an entity would know the identities of the entities who participated in those transactions and none of the transactions would be confidential.

To help preserve the confidentiality of the transactions and obligations, the entities use single-use random public keys as identifiers. Both entities generate a new public key and a corresponding certificate and register them with the mapping service to link their identities to the new public key and certificate. The entities then exchange these public keys and certificates. To generate a new obligation, for example, the from-entity generates the obligation that includes these single-use public keys as obligation-specific public keys to identify the entities. Since each entity has the certificate of the other entity, they can confirm that the obligation-specific public keys are that of the from-entity and the to-entity.

When an initiator network node conducts a network scan, the obligations returned would have the obligation-specific public keys. As a result, the initiator network node would not know that the to-entity of one obligation is the from-entity of another obligation. As such, the initiator network node could not identify any cycles. To overcome this problem, each network node involved in a certain network scan generates a random, scan-specific public key (or some other identifier), which is also single-use, for that network scan. When an entity is to respond to a scan request, the entity replaces its public keys of its obligations with its scan-specific public key. The entity also requests its counter-entities to its obligations to provide their scan-specific public keys. The entity then replaces the obligation-specific public keys of the obligations it shares with the scan-specific public keys of the counter-entities. Thus, the obligations received by an initiator network node will use the same scan-specific public key to identify an entity regardless of how many obligations the entity shares. The initiator network node can then identify the cycles as each entity is identified by only one scan-specific public key.

When a designated network node of a cycle receives the netting transactions for the cycle from the initiator network node, the designated network node directs the generation of the compound transaction for the cycle. The designated network node checks its vault (e.g., data store storing information on its obligations) to determine whether its obligation associated with the cycle is still unsettled. If so, the designated network node adds its obligation to an obligation request messages. The network node then propagates the obligation request message around the cycle by sending it to the to-entity of its obligation so that the to-entity can add its obligation to the compound transaction and forward the obligation request message around the cycle. Each network node in a cycle knows the identity of the next network node in the cycle because they share an obligation. As a result, they know the identity of the next network node in the cycle. The process continues until the designated network node receives the obligation request message from the from-entity of its obligation with the from-entity.

The from-entity and the to-entity of a netting transaction may not know each other's identity. For example, in graph 208 of FIG. 2, F is to provide D with 5 items, but they do not, and to preserve confidentiality should not, know each other's identity. To preserve confidentiality, each to-entity of a netting transaction for a cycle generates a random netting public key and corresponding certificate and provides them to the to-entity of the netting transaction. A to-entity cannot, however, send its netting public key and certificate directly to a from-entity unless they share an obligation. To allow the sending of the netting public keys and certificates, the designated network node may propagate a netting public key request around the cycle for each to-entity to add its netting public key and certificate to the request in a way that is mapped to its obligation-specific public key. Because the network node of a from-entity of a netting transaction may be before (i.e., in the directed cycle of obligations) the network node of the to-entity of that netting transaction, the netting public key request may need to travel around the cycle twice. When a from-entity of a netting transaction receives the netting public keys and certificates of its to-entities, it generates an actual netting transaction for each to-entity and includes them in the netting public key request that it forward to the next network node. When the designated network node receives all the actual netting transactions, it builds the component transaction for the cycle that includes the actual netting transactions and the settlement transaction. The designated network node then propagates the compound transaction around the cycle so that each entity can verify and sign the compound transaction. Upon received the signed compound transaction, the designated network node requests the notary to notarize the compound transaction. Upon receiving the notarized transaction from the notary, the designated network node propagates the notarized compound transaction around the cycle so that each network node of the cycle can store the notarized compound transaction.

Figure 3:
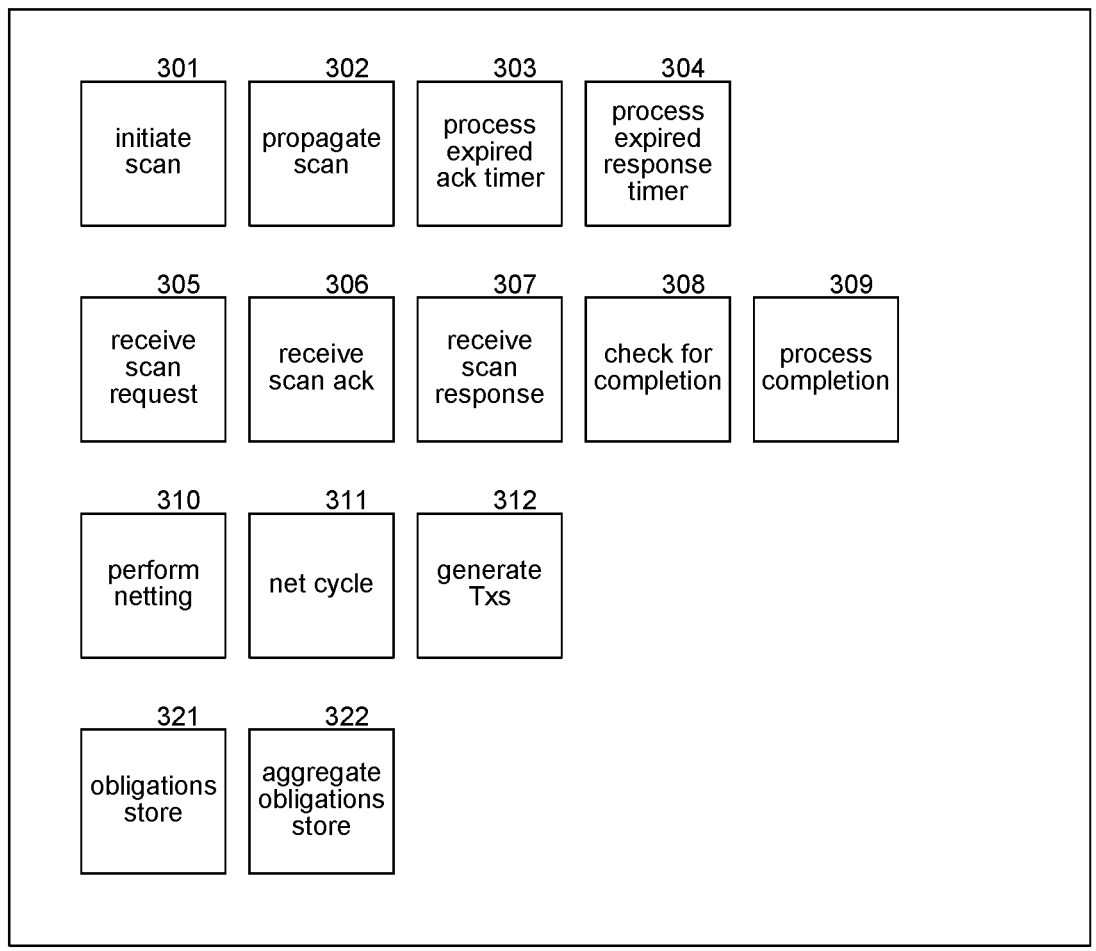
FIG. 3 is a block diagram illustrating components of the TxN system of a target network node of a target entity in some embodiments.

FIG. 3 is a block diagram illustrating components of the T×N system of a target network node of a target entity in some embodiments. Each network node in the network may run a service that provides all the functionality of the components of the T×N system, or some network nodes may exclude those components relating solely to the initiating of a network scan. T×N system 300 includes scanning components 301-309, netting components 310-312, and data stores 321-322. The scanning components include an initiate scan component 301, a propagate scan component 302, a process expired acknowledgment timer component 303, a process expired response timer component 304, a receive scan request component 305, a receive scan acknowledgment component 306, a receive scan response component 307, a check for completion component 308, and a process completion component 309. The initiate scan component initiates a network scan when the target network node is an initiator network node. The propagate scan component sends a scan request message to the network node of each entity that shares an obligation with the target entity. The to-entity and the from-entity of an obligation are considered to share the obligation. The process expired acknowledgment timer component and the process expired response timer component process the scan request messages sent by the target network node whose responses have timed out. The receive scan acknowledgment component processes an acknowledgment that a scan request message has been received. The receive scan request component processes a scan request that has been received by collecting obligations of the target entity, propagating the scan request to network nodes of entities that share an obligation with the target entity, aggregating obligations of the responses to the propagated scan request, and providing the aggregated obligations to the entity from which the scan request was received if the target network node is not the initiator network node. The receive scan response component processes a response to a scan request that the target network node propagated. The check for completion component is invoked to determine whether the scan request propagated by the target node has completed. The process completion component aggregates and sends a scan response. The netting components are invoked by an initiator network node and include a perform netting component 310, a net cycle component 311, and a generate transactions component 312. The perform netting component receives aggregate obligations and generates and submits compound transactions to settle the obligations. The net cycle component identifies the netting transactions for settling obligations of a cycle. The generate transactions component generates the netting transactions of a cycle. The data stores include an obligations store 321 and an aggregate obligations store 322. The obligations store stores the obligations of the target entity and the aggregate obligations store stores the aggregate obligations that the target entity received in response to sending a network scan request.

The computing systems (e.g., network nodes or collections of network nodes) on which the TxN system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the TxN system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The TxN system may be described in the general context of computer-executable instructions, such as program modules and components, executed by one or more computers, processors, or other devices. Generally, program modules or components include routines, programs, objects, data structures, and so on that perform tasks or implement data types of the TxN system. Typically, the functionality of the program modules may be combined or distributed as desired in various examples. Aspects of the TxN system may be implemented in hardware using, for example, an application-specific integrated circuit ("ASIC") or field programmable gate array ("FPGA").

Figure 4:
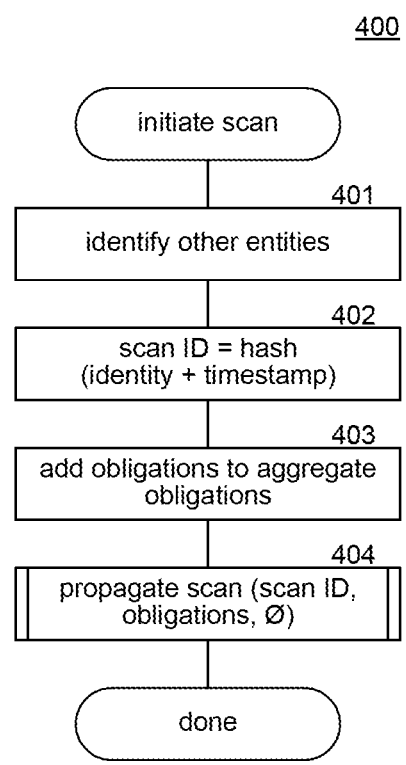
FIG. 4 is a flow diagram that illustrates processing of the initiate scan component of the TxN system in some embodiments.

FIG. 4 is a flow diagram that illustrates processing of the initiate scan component of the TxN system in some embodiments. An initiate scan component 400 of a target entity is invoked to initiate a network scan. The component collects the obligations of a network. In block 401, the component identifies the other entities of the obligations of the target entity by accessing the obligation store of the target entity. In block 402, the component generates a scan identifier that may be a hash of a combination of the identity of the target entity and a time stamp. In block 403, the component adds the obligations of the target entity to the aggregate obligations store. In block 404, the component invokes a propagate scan component to initiate a network scan passing an indication of the scan identifier, the obligations of the target entity, and an indication that the target entity is initiating the network scan. The component then completes with the aggregate obligations store storing the aggregate obligations of the network. In some embodiments, each entity that contributes its obligations to be settled by the netting transactions may specify a netting portion of its inventory (e.g., in response to a scan request) that the entity is willing to contribute to settle its obligations. In such a case, the TxN system limits the total quantity of netting transactions in which the entity is a from-entity to be no more that the netting portion (rather than the total inventory) when generating the netting transactions.

Figure 5:
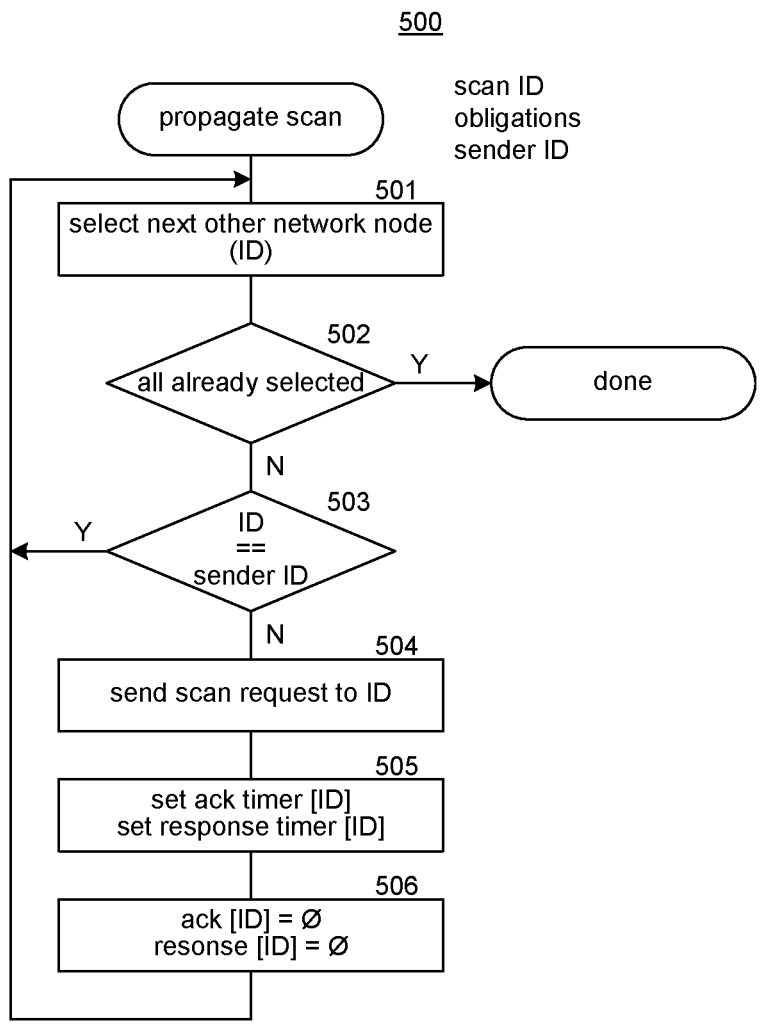
FIG. 5 is a flow diagram that illustrates processing of a propagate scan component of the TxN system in some embodiments.

FIG. 5 is a flow diagram that illustrates processing of a propagate scan component of the TxN system in some embodiments. A propagate scan component 500 is invoked to propagate a scan request from a target network to the other network nodes of other entities that share an obligation with the target entity. The component is passed a scan identifier, the obligations of the target entity, and an identifier of a sender network node that sent a scan request to the target network node, if any. In block 501, the component selects the next other network node of an entity that shares an obligation with the target entity. In decision block 502, if all such network nodes have already been selected, then the component completes, else the component continues at block 503. In decision block 503, if the selected other network node is the same as the sender network node, then the sender network node is responsible for reporting the obligation shared with the target entity and the component loops to block 501 to select the next other network node, else the component continues at block 504. In block 504, the component sends a scan request to the selected other network node. In block 505, the component sets an acknowledgment timer and a response timer for the selected other network node. In some embodiments, if the other network node does not acknowledge the scan request before the acknowledgment timer expires, the target network node assumes that the other network node will not respond and ignores any acknowledgment if it does later send an acknowledgment. If the other network node does acknowledge the scan request before the acknowledgment timer expires but does not send a scan response before the response timer expires, the target network node assumes that the other network node will not respond and ignores any response if it does later send a response. In block 506, the component sets an acknowledgment flag for the selected other network node to indicate that an acknowledgment has not been received and that the timer for the acknowledgment has not expired and a response flag to indicate that a response has not been received and the timer for the response has not expired. The component then loops to block 501 to select the next other network node.

Figure 6:
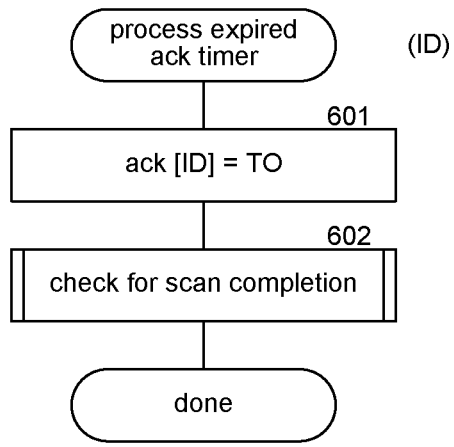
FIG. 6 is a flow diagram that illustrates processing of a process expired acknowledgment timer component of the TxN system in some embodiments.

FIG. 6 is a flow diagram that illustrates processing of a process expired acknowledgment timer component of the TxN system in some embodiments. A process expired acknowledgment timer component 600 is passed an indication that the acknowledgment timer of another network node has expired and processes the expired timer. In block 601, the component sets an acknowledgment flag for the other network node to indicate that the acknowledgment timer has timed out. In block 602, the component invokes a check for scan completion component to determine whether the scanning propagated by the target network node has completed. The component then completes.

Figure 7:
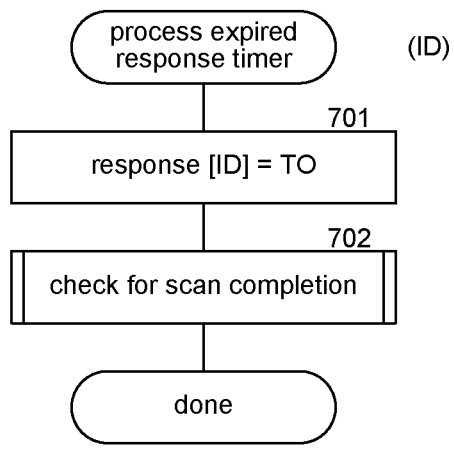
FIG. 7 is a flow diagram that illustrates processing of a process expired response timer component of the TxN system in some embodiments.

FIG. 7 is a flow diagram that illustrates processing of a process expired response timer component of the TxN system in some embodiments. A process expired response timer component 700 is passed an indication that the response timer of another network node has expired and processes the expired timer. In block 701, the component sets a response flag for the other network node to indicate that the response timer has timed out. In block 702, the component invokes a check for scan completion component to determine whether the scanning propagated by the target network node has completed. The component then completes.

Figure 8:
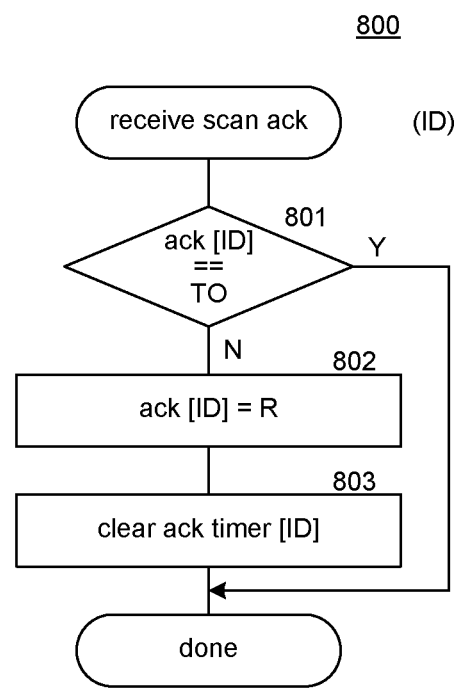
FIG. 8 is a flow diagram that illustrates the processing of a receive scan acknowledgment component of the TxN system in some embodiments.

FIG. 8 is a flow diagram that illustrates the processing of a receive scan acknowledgment component of the TxN system in some embodiments. A receive scan acknowledgment component 800 is passed an indication of another network node and records an indication that the acknowledgment has been received. In decision block 801, if the acknowledgment timer for the other network node has already timed out, then the target entity node ignores the response and returns, else the component continues at block 802. In block 802, the component records an indication that the acknowledgment for the other network node has been received. In block 803, the component clears the acknowledgement timer for the other network node and then completes.

Figure 9:
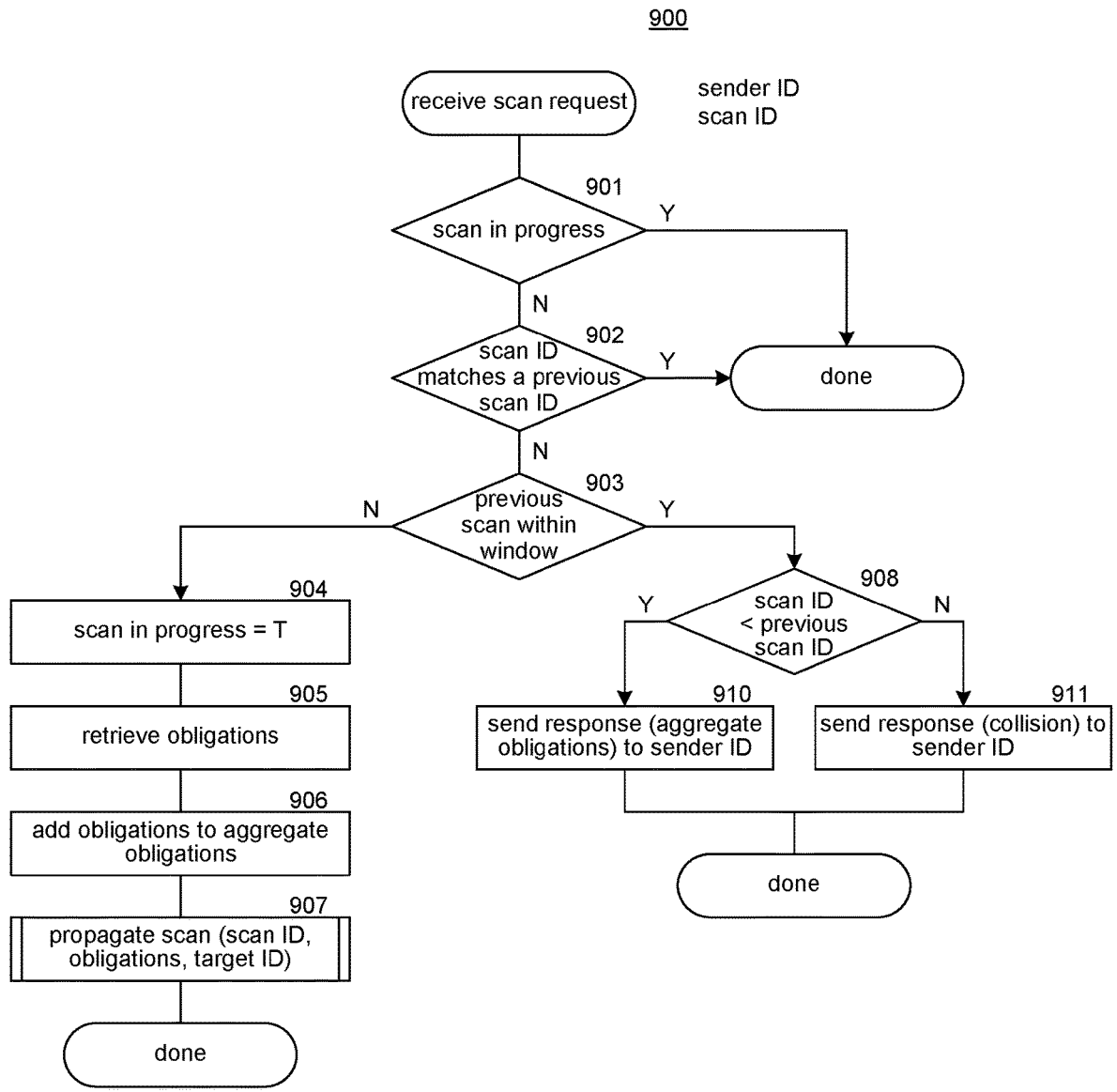
FIG. 9 is a flow diagram that illustrates the processing of a receive scan request component of the TxN system in some embodiments.

FIG. 9 is a flow diagram that illustrates the processing of a receive scan request component of the TxN system in some embodiments. A receive scan request component 900 processes a scan request received by a target network node by propagating the scan request, aggregating obligations, and responding with the aggregated obligations. The component is passed an identifier of the sender network node and a scan identifier. In decision block 901, if a scan by the target node is already in progress, then the component completes, else the component continues at block 902. In decision block 902, if the scan identifier matches a previous scan identifier, then the target network node has already processed a scan request for that scan identifier and the component may send a negative acknowledgment ("nack") and the component then completes, else the component continues at block 903. In decision block 903, if a previous scan request was received within a certain window of time before the current scan request was received, then the component continues at block 908, else component continues at block 904. If the previous scan request was received within the window, then the component may respond with the previously collected obligations. In block 904, the component sets a scan in progress flag to indicate that a scan is in progress. In block 905, the component retrieves the obligations from the obligation store of the target entity. In block 906, the component removes any obligations from the aggregate obligations store and adds the obligations to the aggregate obligations store. In block 907, the component invokes the propagate scan component passing an indication of the scan identifier, the obligations, and the identifier of the target network node and then completes. In decision block 908, if the scan identifier is less than the previous scan identifier, then the component continues at block 910, else component contin-ues at block 911. In block 910, the component sends to the sender network node a response to the scan request with the obligations of the aggregate obligations store, which were collected by the previous scan, and then completes. In block 911, the component sends a response to the sender network node indicating that a collision has occurred and then completes.

Figure 10:
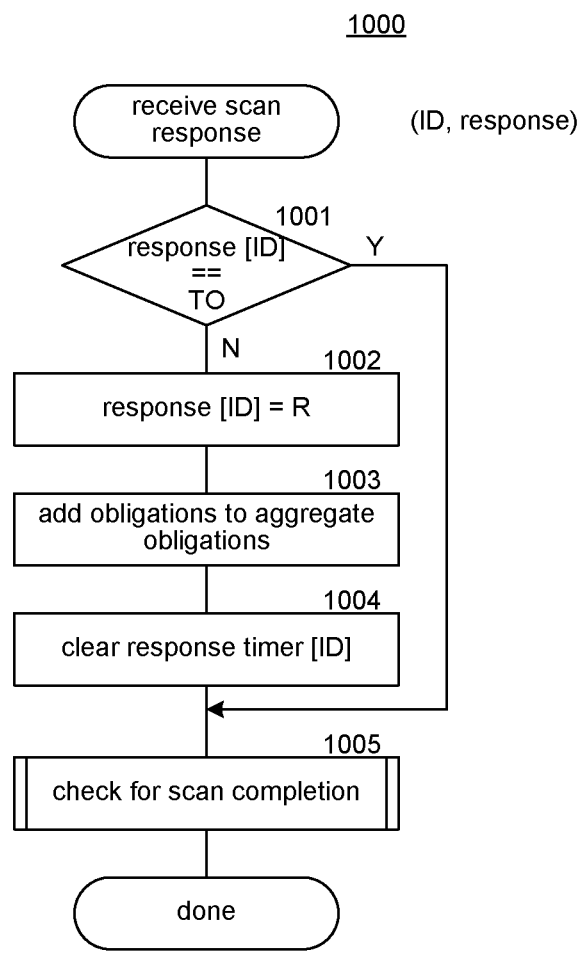
FIG. 10 is a flow diagram that illustrates the processing of a receive scan response component of the TxN system in some embodiments.

FIG. 10 is a flow diagram that illustrates the processing of a receive scan response component of the TxN system in some embodiments. A receive scan response component 1000 is invoked to process a scan response and is passed an identifier of the responding network node and the response. In decision block 1001, if a response timer for the responding network node has expired, then the component continues at block 1005, else the component continues at block 1002. In block 1002, the component sets the response flag for the responding network node to indicate that its response has been received. In block 1003, the component adds the obligations of the response to the aggregate obligations store. In block 1004, the component clears the response timer of the responding network node. In block 1005, the component invokes a check for scan completion component to determine whether the target network node has completed its scan request and then completes.

Figure 11:
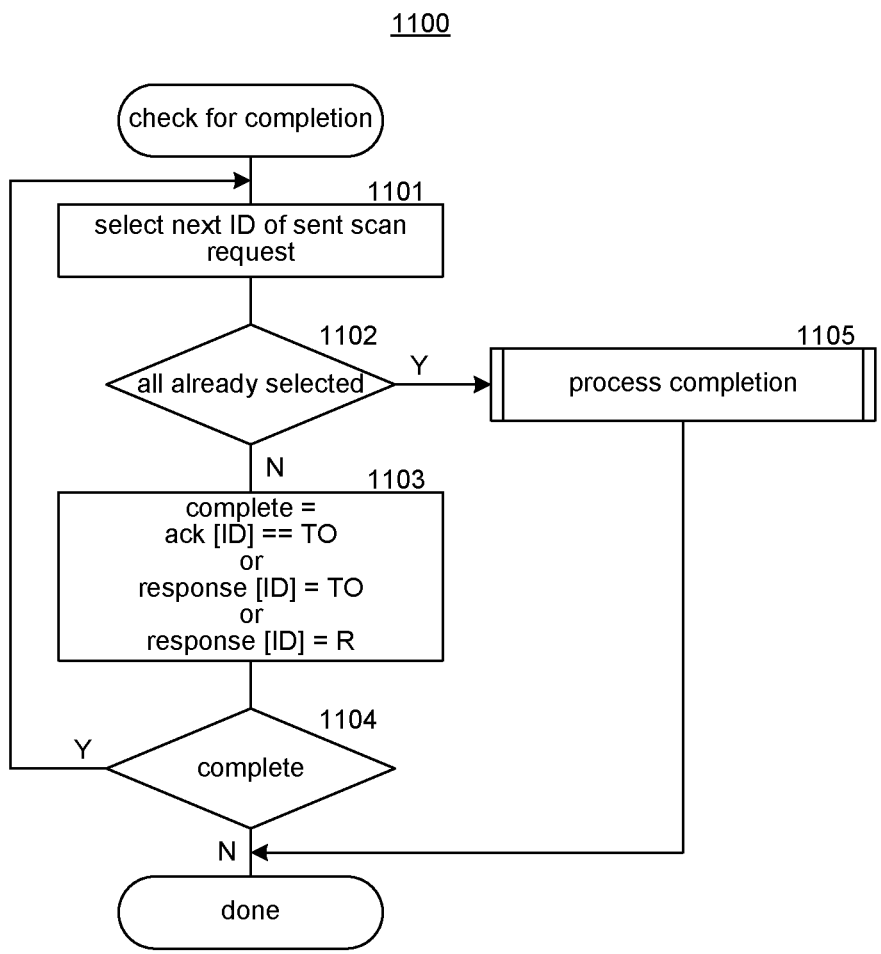
FIG. 11 is a flow diagram that illustrates the processing of a check for completion component of the TxN system in some embodiments.

FIG. 11 is a flow diagram that illustrates the processing of a check for completion component of the TxN system in some embodiments. A check for completion component 1100 is invoked whenever an event occurs that may indicate that the processing of the scan request by the target network node has completed. In block 1101, the component selects the next other network node to which the scan request was propagated. In decision block 1102, if all such other network nodes have already been selected, then the component continues at block 1105, else the component continues at block 1103. In block 1103, the component sets a complete flag for the other network node if the acknowledgment timer or response timer for the other network node has timed out or if a response has been received from the other network node. In decision block 1104, if the selected other network node has its complete flag set to true, then the component loops to block 1101, else at least one other network node has not completed and the component completes. In block 1105, since all the other network nodes have completed, the component invokes the process completion component and then returns.

Figure 12:
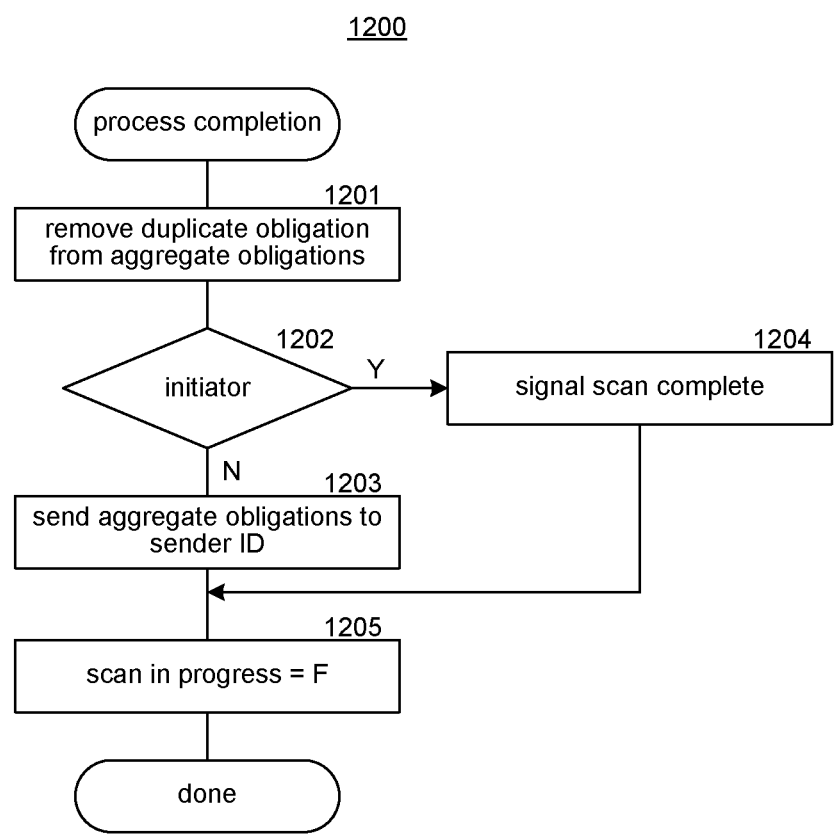
FIG. 12 is a flow diagram that illustrates the processing of a process completion component of the TxN system in some embodiments.

FIG. 12 is a flow diagram that illustrates the processing of a process completion component of the TxN system in some embodiments. A process completion component 1200 is invoked when a target network node determines that all the other network nodes to which it sent a scan request have responded or their responses have timed out and sends a response to the sender network node that sent the request. In block 1201, the component removes any duplicate obligations in the aggregate obligations store. In decision block 1202, if the target network node is the initiator network node, then the component continues at block 1204, else the component continues at block 1203. In block 1203, the component sends the aggregate obligations to the sender network node and then completes. In block 1204, the component sets a signal to indicate that the scan has completed and the TxN system can proceed to generate netting transactions to settle the obligations of the obligation store. In block 1205, the component clears the scan in progress flag and then completes.

Figure 13:
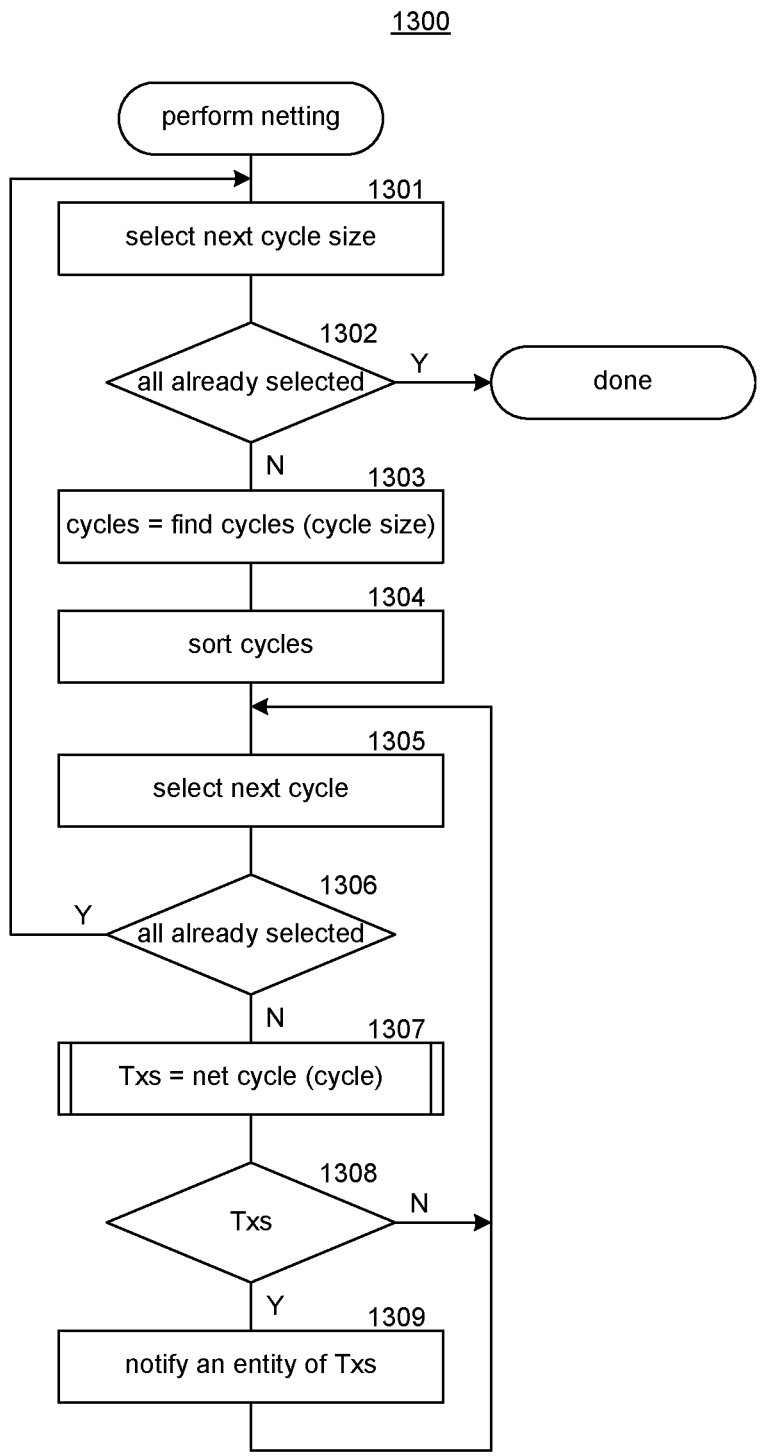
FIG. 13 is a flow diagram that illustrates the processing of a perform netting component of the TxN system in some embodiments.

FIG. 13 is a flow diagram that illustrates the processing of a perform netting component of the TxN system in some embodiments. A perform netting component 1300 is invoked to generate the netting transactions to settle obligations of the aggregate obligations store. In block 1301, the component selects the next larger cycle size starting with a cycle size of three. In some embodiments, the component may start with a cycle size of two for which a pair of entities may share some number of obligations in which each entity of the pair is a from-entity of at least one obligation of the pair and a to-entity of at least one obligation of the pair. These obligations may be considered bilateral obligations. In decision block 1302, if all the cycle sizes have already been selected, then the settling of the obligations is complete and the component completes, else the component continues at block 1303. In some embodiments, the component may set a completion timer that upon expiration terminates the process of settling the obligations even though not all the possible cycles have been processed. In block 1303, the component applies a find cycles algorithm to find the cycles in the obligations of the aggregate obligations store. To find the cycles of vertices (i.e., entities), the component may first identify the strongly connected vertices of the directed graph of entities and their obligations. A group of vertices are strongly connected if each vertex is reachable from every other vertex in the group. An algorithm for identifying strongly connected vertices is described in Tarjan, R. E., "Depth-First Search and Linear Graph Algorithms," SIAM J. Comput., vol. 1, no. 2, 1972, pp. 146-160, which is hereby incorporated by reference. After finding the groups of strongly connected vertices, the component may identify the cycles in each group. An algorithm for finding cycles is described in Johnson, D., "Finding all the Elementary Circuits of a Directed Graph," SIAM J. Comput., vol. 4, no. 1, March 1975, pp. 77-84, which is hereby incorporated by reference. In block 1304, the component sorts the cycles by the aggregate quantity of cycles. The aggregate quantity of a cycle is the sum of the quantities of the obligations of the cycle. In block 1305, the component selects the cycle with the largest aggregate quantity that has not yet been selected. In decision block 1306, if all the cycles of the selected cycle size have already been selected, then the component loops to block 1301 to select the next cycle size, else the component continues at block 1307. In block 1307, the component invokes a net cycle component passing an indication of the cycle to identify the netting transactions for the cycle. In decision block 1308, if at least one transaction was identified, then the component continues at block 1309, else the component loops to block 1305 to select the next cycle. In block 1309, the component notifies a network node of an entity of the transactions to execute the transactions and then loops to block 1305 to select the next cycle.

Figure 14:
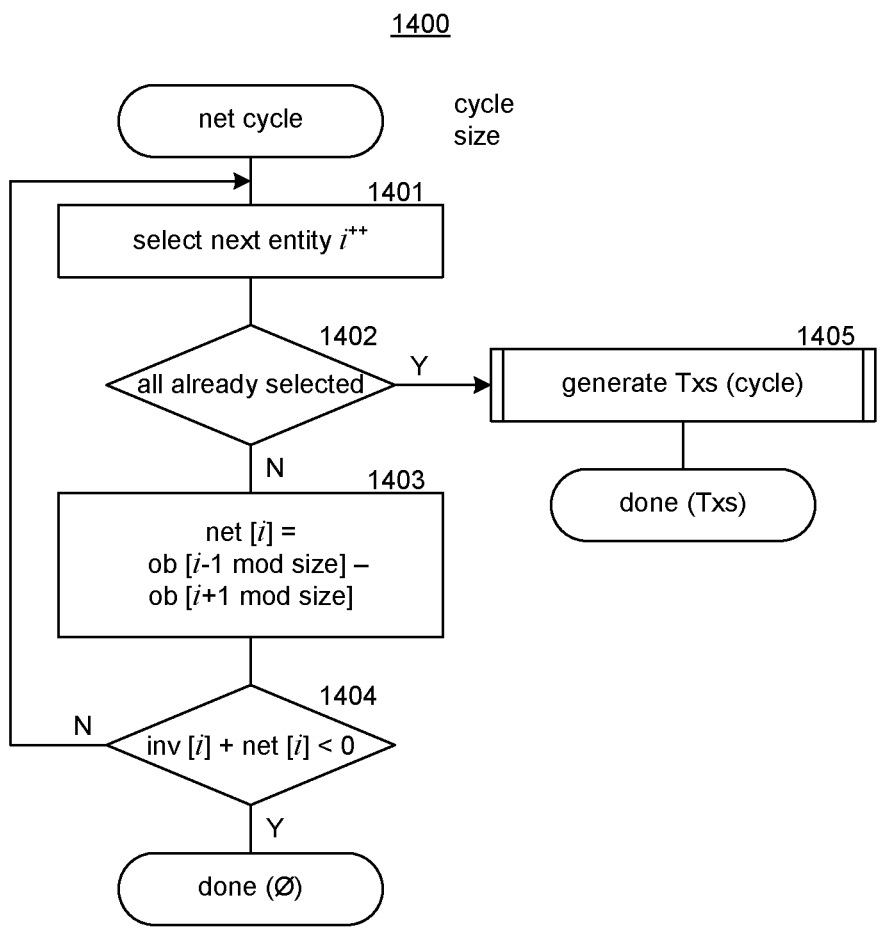
FIG. 14 is a flow diagram that illustrates the processing of a net cycle component of the TxN system in some embodiments.

FIG. 14 is a flow diagram that illustrates the processing of a net cycle component of the TxN system in some embodiments. A net cycle component 1400 is invoked to identify the netting amounts for settling the obligations of the cycle and generating the corresponding transactions. The component is passed an indication of the cycle and the cycle size. In a block 1401, the component selects the next entity of the cycle, assuming the nodes are indexed from one to the cycle size. In decision block 1402, if all the entities of the cycle have already been selected, the component continues at block 1405, else the component continues at block 1403. In block 1403, the component sets the obligation net for the selected entity to the quantity of the input obligation minus the quantity of the output obligation of the selected entity. In decision block 1404, if the inventory of the selected entity plus the obligation net of the selected entity is less than zero, then the obligations of the cycle cannot be settled and the component returns an indication that no transactions were generated, else the component loops to block 1401 to select the next entity of the cycle. In block 1405, the component invokes the generate transaction component and then returns the generated transactions.

Figure 15:
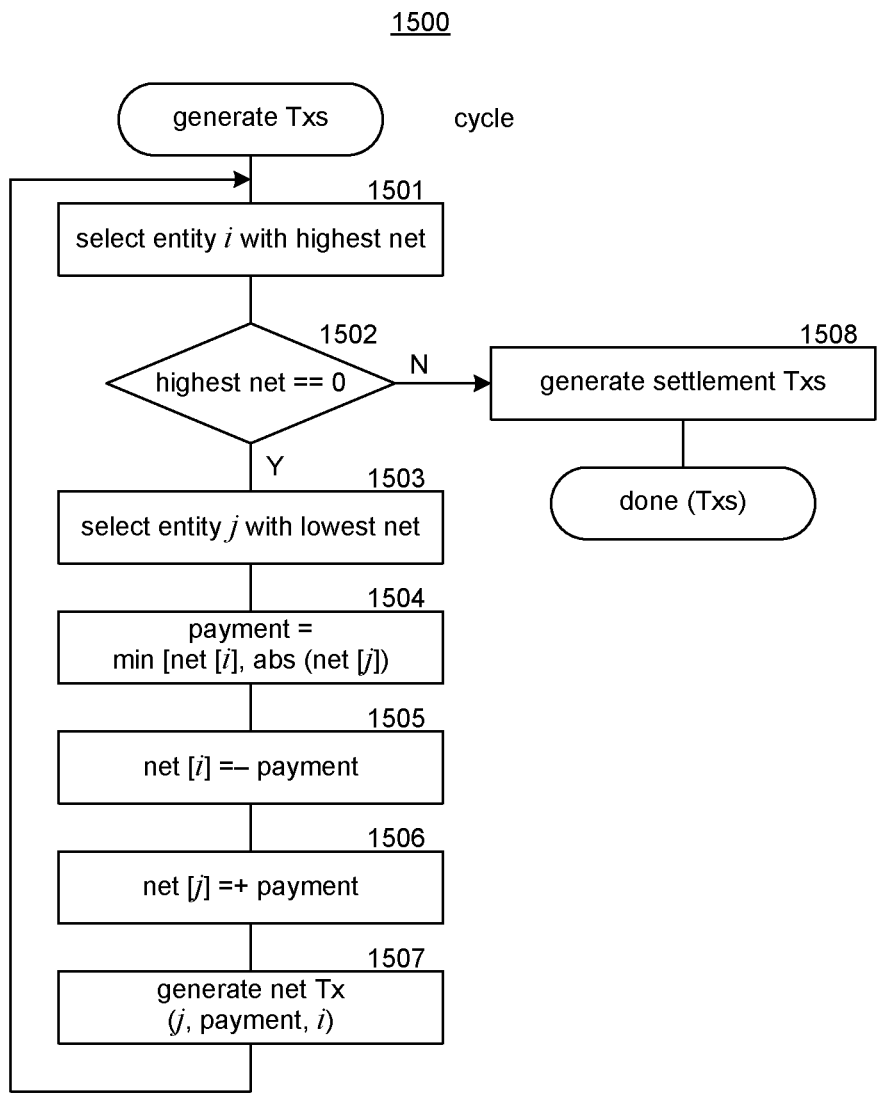
FIG. 15 is a flow diagram that illustrates the processing of a generate transaction component of the TxN system in some embodiments.

FIG. 15 is a flow diagram that illustrates the processing of a generate transaction component of the TxN system in some embodiments. A generate transaction component 1500 is invoked passing an indication of a cycle and generates the netting transactions for the cycle. In block 1501, the component selects the entity of the cycle with the highest obligation net. In decision block 1502, if all the entities have already been selected, then the component continues at block 1503, else the component continues at block 1508. In block 1503, the component selects the next entity with the lowest obligation net. In block 1504, the component generates a payment amount for a transaction that is the minimum of the obligation net of the entity with the highest obligation net and the absolute value of the entity with the lowest obligation net. In block 1505, the component decreases the obligation net of the entity with the highest obligation net by the payment. In block 1506, the component increases the obligation net of the entity with the lowest obligation net by the payment. In block 1507, the component generates a netting transaction in which the selected entity with the lowest obligation net pays the payment amount to the selected entity with the highest obligation and then loops to block 1501 to select the next entity with the highest obligation net. In block 1508, the component generates the settlement transactions for the obligations and then returns the transactions.

The following paragraphs describe various embodiments of aspects of the TxN system. An implementation of the TxN system may employ any combination of the embodiments. The processing described below may be performed by a computing device with a processor that executes computer-executable instructions stored on a computer-readable storage medium that implements the TxN system.

In some embodiments, a method performed by a computing system is provided for settling obligations between entities of a cycle of obligations. Each obligation specifies a quantity of an item that a from-entity of the cycle is obligated to provide to a to-entity of the cycle. The quantity of an obligation is considered an output quantity from the from-entity and an input quantity to the to-entity. Each entity has an inventory of a quantity of the item. For each entity, the method determines whether the inventory and the input quantity of the entity are sufficient to provide the output quantity of the entity. When the inventory and the input quantity of each entity are sufficient to provide the output quantity of each entity, the method identifies one or more netting transactions to settle the obligations of the cycle and executes the netting transactions and settlement transactions to effect and record the settling of the obligations. In some embodiments, the inventory of each entity is not sufficient to provide its output quantity. In some embodiments, the netting transactions and the settlement transactions are performed as an atomic operation. In some embodiments, each entity has a network node in a network and the method further identifies cycles of the entities by initiating, by an initiator network node, a scan for obligations between the entities having nodes in the network by sending a scan request to the network node of one or more entities with which the initiator node shares an obligation, receiving a scan response from one or more nodes indicating obligations of entities, and analyzing the obligations to identify one or more cycles. In some embodiments, each netting transaction identifies a from-entity, a quantity, and a to-entity and the executing of the netting transactions includes generating a compound transaction that includes each of the netting transactions and the settlement transactions, obtaining a signature of each entity of the netting transactions and the settlement transactions of the compound transaction, and submitting the signed compound transaction to a notary for executing the netting transactions and settlement transactions of the compound transaction. In some embodiments, the obtaining of the signatures and the submitting of the signed compound transaction are performed by an entity of a netting transaction of the compound transaction. In some embodiments, a netting transaction identifies an output of a prior transaction of the from-entity from which the quantity is to be provided and wherein the notary verifies that the quantity of that output is unspent. In some embodiments, the identifying of one or more netting transactions to settle the obligations of the cycle further, for each entity, determine an obligation net that is the difference between the input quantity and the output quantity of that entity. The identifying further generates one or more netting transactions such that an entity with a negative obligation net is a from-entity of a netting transaction and an entity with a positive obligation net is a to-entity of the netting transaction. In some embodiments, the generating of a netting transaction further selects the entity with a highest obligation net as the to-entity of a netting transaction and the entity with the lowest obligation net as the from-entity of the netting transaction. The generating further sets the quantity of the netting transaction to the minimum of the obligation net of the to-entity and of the absolute value of the obligation net of the from-entity. The generating further adjusts the obligation net of the from-entity and the obligation net of the to-entity by the quantity of the netting transaction.

In some embodiments, a method performed by one or more computing systems is provided for identifying obligations of entities, each entity having a network node in a network. The method, under control of an initiator network node of an initiator entity, identifies first obligations that the initiator entity shares with first entities, sends a scan request to first network nodes of one or more first entities, and receives a scan response from one or more first network nodes identifying first obligations of entities. Under control of a receiving network node of a receiving entity, the method receives from a sending network node a scan request, identifies second obligations that the receiving entity shares with second entities, sends a scan request to second network nodes of one or more second entities, receives a scan response from one or more second network nodes identifying second obligations of entities, and sends to the sending network node a scan response identifying the second obligations. In some embodiments, the method further, under control of the initiator network node, analyzes the first obligations to identify cycles. In some embodiments, each scan request includes a scan identifier generated by the initiator network node.

In some embodiments, a method performed by a computing system is provided for netting obligations of a cycle of obligations of entities. Each obligation specifies an obligation quantity. Each entity having an inventory. The method determines whether netting transactions can settle the obligations between the entities. When the netting transactions can settle the obligations between the entities, the method generates one or more netting transactions to settle the obligations of the entities and then executes the netting transactions.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system for settling obligations between entities of a cycle of obligations, each obligation specifying a quantity of an item that a from-entity of the cycle is obligated to provide to a to-entity of the cycle, the quantity of an obligation being an output quantity from the from-entity and an input quantity to the to-entity, each entity having an inventory of a quantity of the item, the method comprising:

initiating a scan for obligations between the entities, the scan initiated by an initiator node of an initiator entity of a network of entity nodes, the initiator node being a computing system, each entity node being a computing system and is associated with an entity, the entity node for an entity maintains a portion of a decentralized distributed ledger that stores transactions relating to obligations to which the entity is a from-entity or a to-entity wherein no entity node stores all the transactions of the decentralized distributed ledger, the initiating including:

sending a scan request to entity nodes of one or more entities with which the initiator entity shares an obligation wherein receiving entity nodes of receiving entities that receive a scan request propagate the scan request to other receiving entity nodes of other receiving entities with which that receiving entity shares an obligation;

receiving a scan response from one or more receiving entity nodes to which the initiator node sent a scan request, a scan response indicating one or more obligations of the receiving entity and one or more obligations of entities with which that receiving entity shares an obligation; and analyzing the obligations to identify one or more cycles;

for each of the one or more cycles, for each entity of the cycle, determining whether the inventory and the input quantity of the entity are greater than or equal to the output quantity of the entity; and when the inventory and the input quantity of each entity of the cycle are greater than equal to the output quantity of each entity, generating one or more netting transactions to at least partially settle one or more obligations of the cycle;

generating one or more settlement transactions to settle one or more obligations; and executing the netting transactions and settlement transactions to effect and record the netting and settling of the one or more obligations.

2. The method of claim 1 wherein the inventory of each entity is less than its output quantity.

3. The method of claim 1 wherein the executing of the netting transactions and the settlement transactions are performed as an atomic operation.

4. The method of claim 1 wherein each netting transaction identifies a from-entity, a quantity, and a to-entity and the executing includes:

generating a compound transaction that includes each of the netting transactions and the settlement transactions;

obtaining a signature of each entity of the netting transactions and the settlement transactions of the compound transaction; and submitting the signed compound transaction to a notary for executing the netting transactions and settlement transactions of the compound transaction.

5. The method of claim 4 wherein the obtaining of the signatures and the submitting of the signed compound transaction are performed by an entity of a cycle.

6. The method of claim 1 wherein a netting transaction identifies an output of a prior transaction of the from-entity from which the quantity is to be provided and wherein a notary verifies that the quantity of that output is unspent.

7. The method of claim 1 wherein the generating of one or more netting transactions to settle the obligations of a cycle comprises:

for each entity of the cycle, determining an obligation net that is the difference between the input quantity and the output quantity of that entity; and generating one or more netting transactions such that an entity with a negative obligation net is a from-entity of a netting transaction and an entity with a positive obligation net is a to-entity of the netting transaction.

8. The method of claim 7 wherein the generating of a netting transaction comprises:

selecting the entity with a highest obligation net as the to-entity of a netting transaction and the entity with the lowest obligation net as the from-entity of the netting transaction;

setting the quantity of the netting transaction to the minimum of the obligation net of the to-entity and of the absolute value of the obligation net of the from-entity; and adjusting the obligation net of the from-entity and the obligation net of the to-entity by the quantity of the netting transaction.

9. One or more computing systems of an initiator node for netting obligations between entities, each entity having an entity node that is a network node of a network of nodes, the entity nodes being computing systems forming a decentralized distributed ledger for storing transactions, wherein entity nodes of entities store only a portion of the decentralized distributed ledger and wherein the portion stored by an entity node of an entity includes transactions to which the entity is a party, the one or more computing systems comprising:

one or more computer-readable storage mediums for storing computer-executable instructions for controlling the one or more computing systems to:

conduct a scan that propagates a scan request through the network by:

sending scan requests to entity nodes of the decentralized distributed ledger to identify obligations and inventory of the entities, each obligation having a from-entity and a to-entity and a quantity wherein an entity node that receives a scan request forwards the scan request to one or more entity nodes of entities with which it shares an obligation, each entity node that receives a scan request sends to the entity node from which it received the scan request an indication of its one or more obligations and inventory and of one or more obligations and inventory received from entity nodes to which it sent a scan request; and receive from the entity nodes of the decentralized distributed ledger the indications of the obligations and inventory of the entities;

identify cycles of obligations of entities in which each entity is a from-entity of an obligation of the cycle and a to-entity of an obligation of the cycle;

for each entity of a cycle, determine whether a sum of the inventory of the entity and the quantity of the obligation that the entity is a to-entity is greater than or equal to the quantity of the obligation that the entity is a from-entity; and upon determining that each entity has the sum that is greater than or equal to, generate one or more transactions that each at least partially settle an obligation; and send each transaction to the entities of the obligation that the transaction at least partially settles wherein at least one obligation of the cycle is settled to reduce the number of outstanding obligations; and one or more processors for executing the computer-executable instructions stored in the one or more computer-readable storage mediums.

10. The one or more computing systems of claim 9 wherein the transactions include a netting transaction to transfer a quantity from one entity to another entity.

11. The one or more computing systems of claim 9 wherein the transactions include a settlement transaction that settles an obligation.

12. The one or more computing systems of claim 9 wherein instructions that sends each transaction to the entities of the obligations that the transaction at least partially settles send the transactions to a first entity node of a first entity and the first entity node sends one or more of the transactions to a second entity node of a second entity node, the first entity being a from-entity of an obligation and the second entity being a to-entity of that obligation.

13. The one or more computing systems of claim 12 wherein an entity node of a to-entity of an obligation that receives a transaction sends the transaction to an entity node of a from-entity of that obligation.

14. The one or more computing systems of claim 9 wherein the instructions further generate an obligation that specifies a from-entity and a to-entity where each entity is identified by a single-use random public key.

15. The one or more computing systems of claim 14 wherein the from-entity and the to-entity:

each requests a certificate to be issued by a certificate authority, a certificate identifying the single-use public key and signed by the certificate authority, and exchange certificates so that another entity cannot identify the from-entity or the to-entity of the obligation based on the single-use public key.

16. The one or more computing systems of claim 15 wherein the instructions further:

generate by a first entity a first scan-specific identifier;

access a second scan-specific identifier of a second entity that the first entity shares an obligation; and replace the public keys of the obligation with the first scan-specific identifier and the second scan-specific identifier.

17. The one or more computing systems of claim 9 wherein each obligation includes public keys a to-entity and a from-entity of the obligation and the instructions further propagate a netting public key request to the entity nodes of the entities of the obligations of the cycle wherein each entity generates a netting specific public key and the netting public keys are used to identify the to-entities and the from-entities in the netting transactions.

18. The one or more computing systems of claim 9 wherein the obligations are for quantities of a commodity.

19. The one or more computing systems of claim 9 wherein the obligations are for petroleum.

* * * * *